United States Patent Office 3,137,523
Patented June 16, 1964

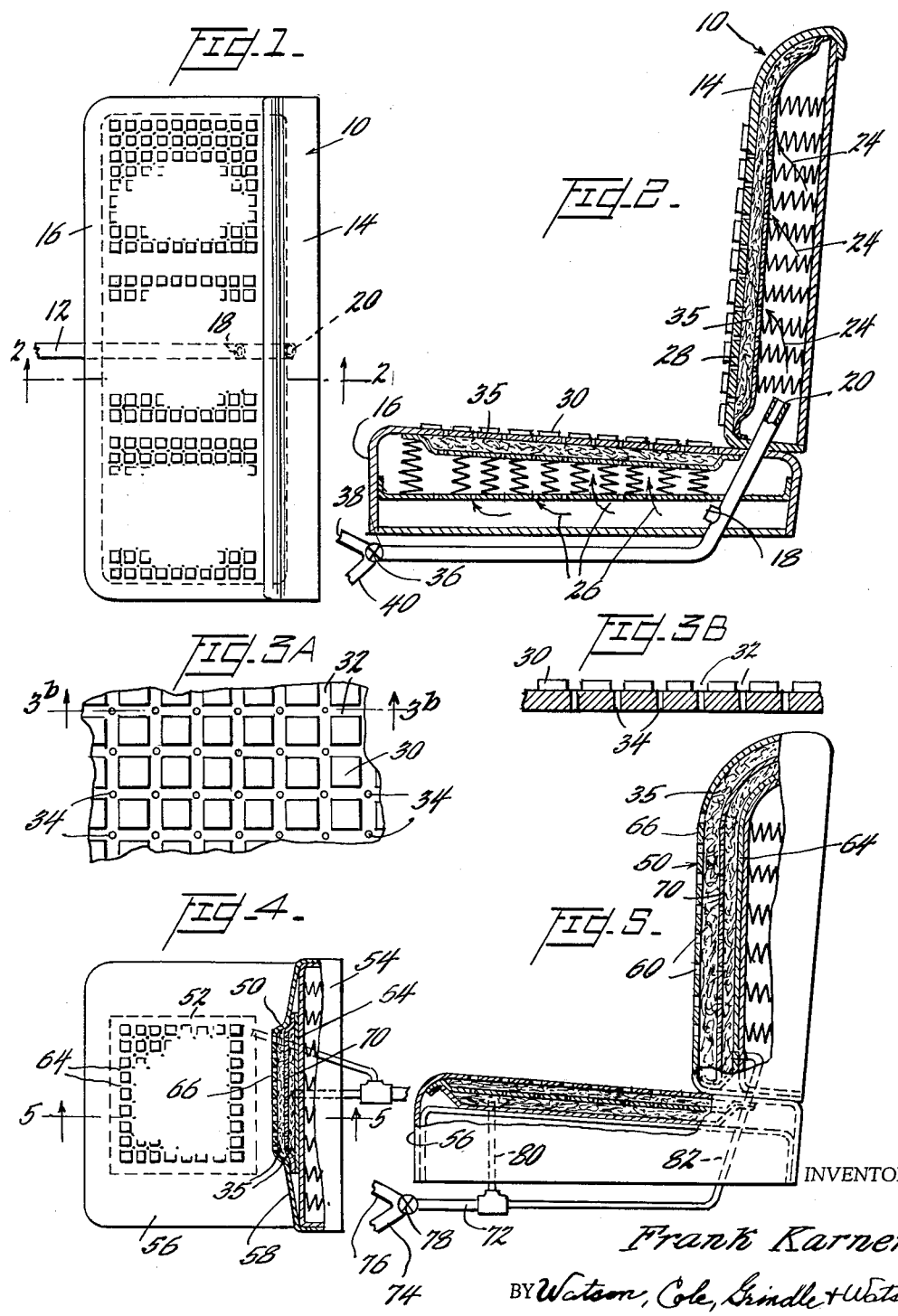

3,137,523
AIR CONDITIONED SEAT
Frank Karner, 5609 54th Ave., Apt. 6, Tanglewood Apts., East Riverdale, Md.
Continuation of application Ser. No. 30,220, May 19, 1960. This application Sept. 20, 1963, Ser. No. 310,501
15 Claims. (Cl. 297—180)

This invention relates to an air conditioning system and more particularly to an air conditioning system for a vehicle seat.

Heretofore, systems have been employed which introduced conditioned air, either heated or cooled, to a region beneath the seat. In such a system, conventional padding and fabric was employed in the seats and thus the air was required to escape by passing through the relatively thick paddings and coverings. This system exhibited numerous disadvantages. For example, relatively little of the air escaped through the fabric where the fabric contacted the occupant. Accordingly, insufficient air passed through the fabric adequately to heat or cool the body portions in contact with the seats. I have discovered an improved system in which the above disadvantages may be obviated.

Accordingly, it is an object of this invention to provide an improved air conditioning system for a vehicle seat.

It is another object of this invention to provide an improved seat structure to be used in combination with an air conditioning system.

It is another object of this invention to provide an air conditioned seat which may be assembled by an unskilled person after the car is manufactured.

Briefly, in accordance with one illustrative embodiment of this invention, conditioned air is introduced into a novel seat structure in which pockets are formed integrally with the seats and which permits the escape of the conditioned air only at the forward and vertical surfaces of the seat. The seat structure includes a separate upper back member and a lower seating member, either or both of which may be provided with a pocket and conditioned air is introduced into the pocket for heating or cooling the occupant of the seat. The surfaces of the seat are impervious to air, except the portion which overlies the pocket and a porous covering extends over the pocket, with air permeable padding incorporated in the pocket which is sufficiently porous to diffuse the flow of air as it passes out of the pocket through the covering. Advantageously, escape of conditioned air is provided for by covering, such as fabric, plastic or leather, with relatively large apertures therein. This covering may be formed with grooves on the outer periphery, and these grooves communicate with punched holes in the surface of the material such that the punched holes permit the escape of conditioned air from the portions of the seat only adjacent the body of the occupant and this conditioned air passes through the numerous ditches to make contact with the occupant of the seat. Preferably, wide mesh fabric is used only at the points which contact the occupants, the remaining portions being impervious to air. With such a system, the occupant experiences conditioned air about the portions of the body which make contact with the seat, regardless of the temperature of the ambient air. It is essential to the operation of such a system that air does not escape from the rear portions of the seat, by that is meant, the back surface of the seat, or in any region not contacted by the body of the person occupying the seat.

In accordance with another illustrative embodiment of this invention, a seat covering for use with an air conditioning system is provided in the form of an airtight pocket with the exception of one surface. The forward, or top portion, of the pocket is provided with relatively large mesh fabric to permit the escape of conditioned air only where the covering is contacted by the body of the occupant. The pocket is filled with material having a high degree of voids, for example, rubberized curled hair. Advantageously, this pocket may be provided with a separator between the intake port for the conditioned air and the perforated surface. The separator provides for uniform distribution for the conditioned air throughout the pocket. Advantageously, these pockets may be employed on the front surface of the seat back and the horizontal surface of the seat. It is, of course, not necessary that both members be employed since either of these pockets may be sufficient to produce the desired conditioning.

It is, of course, understood that these pockets may be built into the seats or provided as a separate part which may be used over the seat cover or formed integrally with a seat cover which is applied to the seat by the user.

In accordance with each of these illustrative embodiments, the padding for the seats in the first embodiment and in the pocket is preferably of material having wide air passages therethrough. For example, the padding may be formed of rubberized, curled hair.

These and various other objects and features of the invention will be more clearly understood from a reading of the detailed description of the invention in conjunction with the drawing, in which:

FIG. 1 is a view in plan of a seat employing one illustrative embodiment of this invention;

FIG. 2 is a side view of the embodiment of FIG. 1 taken along the lines 2—2 of FIG. 1;

FIGS. 3A and 3B are plan and section views, respectively, of portions of the embodiment of FIGS. 1 and 2 to an enlarged scale;

FIG. 4 is a view in plan, partly in section, of another illustrative embodiment of this invention; and FIG. 5 is a view in elevation taken along the lines 5—5 of FIG. 4.

Referring now to FIG. 1, there is depicted in plan a vehicle seat 10 and an inlet conduit 12 for the introduction of conditioned air within the pocket which is integral with the seat. The seat 10 is comprised of an upper back member 14 and a lower seat member 16. Advantageously, the conduit 12 is provided with a pair of outlets 18 and 20 which communicate with the pockets of the upper and lower seat members, respectively. The circulation of the conditioned air in the respective upper and lower members is in accordance and in direction of the arrows 24 and 26, respectively. It is essential to the proper operation of this device that adequate passages be provided on the upper surface 30 of the lower member and the forward surface 28 of the upper member 14.

The details of one form of the covering material are shown in FIGS. 3A and 3B. As best seen in FIG. 3B, the material is provided with angularly disposed grooves 32 having numerous punched holes or apertures 34 therein. The conditioned air passes through the padding material 35 which has a high percentage of voids, through the holes or apertures 34 into the grooves 32. Preferably, the grooves are formed in groups with one group angularly disposed relative to the other group. As illustrated in FIG. 3A, the grooves are depicted as including two groups disposed at right angles to each other the apertures 34 being positioned at the intersection of the groups of grooves. Although it is not essential that this specific form of surface material be employed, it is essential that the material employed may have large passages therein at the respective surfaces 30 and 28, while the remaining surfaces must be airtight. For example, the loss of air from the rear of the upper member 14 would substantially destroy the usefulness of the air conditioned upper member 14. In other words, the pressure of the occupant would be sufficient to prevent the passage of air through the seat in the area of the occupant. Similarly, any loss of conditioned air from the lower member 16, for example, through the rearward surface thereof, would destroy the usefulness of the air conditioning of the lower member 16.

Advantageously, the inlet pipe 12 may have a butterfly valve 36 therein, and the inlet pipe 12 may communicate with a first pipe 38 and a second pipe or conduit 40. One of these conduits, for example, 38, communicates with the air conditioning system which either heats or cools the air in accordance with the setting of suitable controls (not shown), while the conduit 40 communicates with an air intake which is vented, preferably forwardly, to the exterior of the vehicle. Thus, it is possible, by selectively controlling the position of the butterfly valve 36, to control the admission and balance between heated or cooled air and air vented from the exterior of the car. Valve 36 may vary in position according to the balance of air pressure from the two intakes 38 and 40 which have individual control valves (not shown).

The second illustrative embodiment of this invention is depicted in FIGS. 4 and 5 in plan and elevation, respectively. As shown in FIG. 4, a pair of pockets 50 and 52 are positioned on the exterior surfaces of the upper back member 54 and the lower or seating member 56, respectively. As depicted in FIG. 4, these pockets are formed integrally with the seat covers 58 and are provided with suitable apertures 60 and 62, respectively. The details of these pockets are best seen in FIG. 5. As therein depicted, the pocket 50 includes a first surface 64 which is impervious to air, a second surface 66 which is formed integrally with seat cover 58 and has numerous perforations 60 therein. Between the surfaces 64 and 66, a separator 70 is provided which is perforated to provide for a uniform distribution of conditioned air about the pocket 50 to facilitate the distribution of air throughout the forward and rear portions of the pocket 50. These portions of the pocket are preferably filled with a material having large air passages therethrough, for example, rubberized, curled hair. This material is also advantageously employed as the padding for the upper and lower member 14 and 16 of the embodiment of FIGS. 1 through 3. The lower member 56 of the seat, depicted in FIG. 5, is provided with a pocket 52 which is formed integrally with the surface of the lower member 56. The construction of the pocket 52 is substantially identical with that of the pocket 50. Advantageously, the conduit 72 communicates about the heating and cooling system through one branch of the Y 74 and communicates with the ambient air through the other branch of the Y 76. Also, advantageously, the pipe or conduit 72 is provided with a suitable selection valve 78, such as a butterfly valve, suitably to control the air admitted to the pockets 50 and 52. The pipe 72 communicates with the pockets 50 and 52 through suitable conduits 80 and 82, which conduits may be formed of air impervious flexible material, such as neoprene.

Although the pockets 50 and 52 have been described as being formed integrally with the seat covers such that they may be installed by the vehicle user merely by slipping the seat members covers over the seats in a well-known manner, these pockets may be formed as separate units which may be secured to the seat members by the user. Also, advantageously, the pockets 50 and 52 may be formed as separated cushions with suitable stiffening material to support the pockets, such that these members may be placed in position and removed without regard to the usual seat covers.

While I have shown and described two illustrative embodiments of this invention, it will be clearly understood by those skilled in the art that the features thereof may be employed in other embodiments without departing from the scope of this invention, as set forth in the claims.

This is a continuation of my application Serial No. 30,220, filed May 19, 1960, which is a continuation-in-part of my application Serial No. 840,476, filed September 16, 1959.

I claim:

1. An air-conditioned seat comprising an upper vertical member and a lower horizontal member, a covering for said upper vertical and said lower horizontal members, pockets formed integrally in said upper vertical and lower horizontal members by said covering, angularly disposed raised portions formed on the outer side of said pockets adjacent the body of an occupant of said seat, practically non-deformable grooves formed in said covering between said raised portions, apertures from the said grooves to the interior of said pockets, a portion of the covering for the under part of said lower horizontal member being impervious and a portion of the covering for the rear side of said upper vertical member being impervious, a separator within said pockets, spaced apertures in said separator, the space between the said separator and the angular raised portions of said covering being filled with a material having a high percentage of voids, and means for feeding conditioned air into said pockets.

2. An air conditioned seat comprising at least one member positioned to register with substantially the entire body area of at least the seat of a person in sitting position but not to the extent significantly beyond the body area, a covering for said member, a pocket formed integrally in said member by said covering, angularly disposed raised portions formed on the outer side of said pocket adjacent the body of an occupant of said seat, practically non-deformable grooves formed in said covering between said raised portions, apertures from the said grooves to the interior of said pockets, a portion of the covering for the under part of said member being impervious, a separator within said pockets, spaced apertures in said separator, the space between the said separator and the angular raised portions of said covering being filled with a material having a high percentage of voids, and means for feeding conditioned air into said pockets.

3. An air conditioned body support comprising means forming a support surface, said surface including flexible sheet material, said material having at least one groove in one side thereof, means forming a chamber on the opposite side of said material, said material having apertures therein, at least one of said apertures being aligned with said groove air diffusing padding having a high percentage of voids in the chamber, and, means for supplying conditioned air to said chamber, whereby conditioned air in said chamber flows through the padding and the apertures and along said groove.

4. An air conditioned support as defined in claim 3 wherein said support surface includes at least one of a seat support surface and a back support surface.

5. An air conditioned support as defined in claim 3 wherein said chamber has impervious walls and at least one opening therein adjacent said material.

6. An air conditioned support as defined in claim 3 wherein said means for supplying conditioned air includes a butterfly valve for selectively directing air from a plurality of sources.

7. An air conditioned support as defined in claim 4 wherein said chamber has impervious walls and at least one opening therein adjacent said material, said opening being smaller than said support surfaces whereby the body of an occupant covers the opening.

8. An air conditioned body support as defined in claim 3 having means for mounting on a vehicle seat.

9. An air conditioned seat comprising means forming a seat support surface and a back support surface, at least one of said surfaces including flexible sheet material, said material having a plurality of grooves in one side thereof, means forming a chamber on the opposite side of said material, and said material having apertures therein, at least one of said apertures being aligned with one of said grooves, said chamber having impervious walls and an opening adjacent said material, filler having a high percentage of voids, said filler being contained within the chamber, a separator having perforations therein, means mounting said separator within the chamber for uniform distribution of air, and means for supplying conditioned air to said chamber.

10. An air conditioned seat comprising means forming a seat support surface and a back support surface, at least one of said surfaces including flexible sheet material, said material having a plurality of grooves in one side thereof, means forming a chamber on the opposite side of said material, and said material having apertures therein, said apertures being aligned with said grooves, said chamber having impervious walls and an opening adjacent said material adjacent to the occupant of the seat, a separator, filler having a high percentage of voids, said filler being contained within the chamber, said separator having perforations therein for uniform distribution of conditioned air, means for supplying conditioned air to said chamber, and valve means for directing air selectively from a plurality of sources to said supply means.

11. An air conditioned seat comprising at least one of an upper back member and a lower seating member, said member having a body contact surface and provided with at least one pocket, means for introducing conditioned air into said pocket, the surfaces of the pocket being impervious to air except for the body contact surface, padding material within the pocket, said padding material having a high percentage of voids to permit passage of introduced air therethrough to said body contact surface and a covering separate from said padding, said covering extending over said body contact surface and having therein apertures to permit the exhaust of air from the pocket and having at least one groove therein on the side opposite said pocket, at least one of said apertures being aligned with said groove.

12. An air conditioned seat as defined in claim 11 wherein said apertures are positioned in a portion of said covering, thereby preventing the escape of conditioned air in areas remote from the body contact area.

13. An air conditioned seat as defined in claim 11 wherein said pocket has a separator therein, said separator having said padding material on opposite sides thereof and having a plurality of apertures therethrough whereby air is uniformly distributed to said apertures.

14. An air conditioned seat as defined in claim 11 wherein said means for introducing conditioned air includes a butterfly valve for directing air selectively from a plurality of sources.

15. In a vehicle, occupant support means comprising means forming a support surface, said surface including flexible sheet material, said material having at least one groove in one side thereof, means forming a chamber on the opposite side of said material, said material having apertures therein, at least one of said apertures being aligned with said groove air diffusing padding having a high percentage of voids in the chamber, and, means for supplying conditioned air to said chamber, whereby conditioned air in said chamber flows through the padding and the apertures and along said groove.

References Cited in the file of this patent

UNITED STATES PATENTS

| | | |
|---|---|---|
| 837,281 | Bray | Dec. 4, 1906 |
| 859,828 | McCloud | July 9, 1907 |
| 1,314,791 | Dudley | Sept. 2, 1919 |
| 1,317,275 | Dudley | Sept. 30, 1919 |
| 1,568,471 | Roemer | Jan. 5, 1926 |
| 1,754,665 | Anthony | Apr. 15, 1930 |
| 1,854,163 | Paesler | Apr. 12, 1932 |
| 1,903,037 | Fraver | Mar. 28, 1933 |
| 2,022,959 | Gordon | Dec. 3, 1935 |
| 2,782,834 | Vigo | Feb. 26, 1957 |
| 2,826,135 | Benzick | Mar. 11, 1958 |
| 2,912,832 | Clark | Nov. 17, 1959 |
| 2,978,972 | Hake | Apr. 11, 1961 |
| 3,014,226 | Wilfert | Dec. 26, 1961 |

FOREIGN PATENTS

| | | |
|---|---|---|
| 271,598 | Switzerland | Feb. 1, 1951 |

UNITED STATES PATENT OFFICE
CERTIFICATE OF CORRECTION

Patent No. 3,137,523                                      June 16, 1964

Frank Karner

It is hereby certified that error appears in the above numbered patent requiring correction and that the said Letters Patent should read as corrected below.

Column 3, lines 21 and 22, for "intakes" read -- intake pipes --; line 64, strike out "the seat members cover over the seats" and insert instead -- the seat covers over the seat members --.

Signed and sealed this 17th day of November 1964.

(SEAL)
Attest:

ERNEST W. SWIDER                                    EDWARD J. BRENNER
Attesting Officer                                        Commissioner of Patents